United States Patent [19]
Schneider et al.

[11] 3,788,232
[45] Jan. 29, 1974

[54] TRANSPORT SYSTEM

[75] Inventors: Karl Schneider, Plan-les-Ouates/Géneve; Gerard Cuénoud, Grand-Lancy/Geneve; Gabriel Bouladon, Versoix/Geneve; Paul Zuppiger, Athenaz/Geneve, all of Switzerland

[73] Assignee: Battells Memorial Institute, Carough, Geneva, Switzerland

[22] Filed: Apr. 17, 1972

[21] Appl. No.: 244,722

[30] Foreign Application Priority Data
Apr. 20, 1971 Switzerland.................. 5722/71

[52] U.S. Cl. .................................... 104/88, 104/28
[51] Int. Cl. .............................................. B61g 3/00
[58] Field of Search ................ 104/1, 18, 20, 25, 88

[56] References Cited
UNITED STATES PATENTS
| | | | |
|---|---|---|---|
| 3,118,392 | 1/1964 | Zimmerman | 104/88 |
| 3,451,350 | 6/1969 | Bryson | 104/88 |
| 3,483,829 | 12/1969 | Barry | 104/18 |

Primary Examiner—Gerald M. Forlenza
Assistant Examiner—D. W. Keen
Attorney, Agent, or Firm—Robert E. Burns & Emmanuel J. Lobato

[57] ABSTRACT

A transport system comprising a network of transport tracks and vehicles in the form of a U-shaped cabins movable on the transport track and into and from sunk positions on withdrawal and supply tracks located at a lower level than the transport track. The transport tracks are in the form of closed track loops with a recycling track section, a passenger entry station and a passenger exit station at each end of the track loop. At least one of the recycling track sections is connected through the vehicle withdrawal and supply tracks to a vehicle distribution and storage track. Each passenger entry station is provided with means for ascertaining the number of vehicles required by counting the number of arriving passengers and for feeding the corresponding data to a computer which accordingly transfers the required number of vehicles from the distribution and storage track to the transport tracks and controls the setting of shunting switches as required.

1 Claim, 6 Drawing Figures

TRANSPORT SYSTEM

This invention relates to a transport system comprising a network of transport tracks, vehicles movable on the transport tracks and means for individually driving the vehicles.

The Swiss Pat. No. 443,390 discloses an endless continuous passenger transport system comprising a plurality of series of vehicles adapted to be moved on a closed track circuit by endless screws alternating with pulling cables which are arranged along the track circuit and also serve to accelerate and decelerate the vehicles in the circuit portions adjacent the passenger entry and exit stations. In this transport system all the vehicles are permanently kinematically firmly connected to their drive means. Therefore, all the vehicles move simultaneously on the track circuit even if only one of the vehicles is occupied by passengers.

Consequently, this type of transport system is economical in operation only if constantly a sufficiently high number of passengers can be transported. In effect, if all the vehicles are driven simultaneously even if only a few of them are occupied, the result is not only an unnecessary waste of power but also a rapid wear of the system with consequent high maintenance cost.

The total number of vehicles used in the transport system must be sufficient to ensure easy transportation of all passengers in rush hours. However, in most cases where such a transport system can be employed this maximum capacity of transportation is required only occasionally. Therefore, the system must continuously work as if there was the maximum amount of traffic and consequently its usefulness is only very limited.

It is the object of the present invention to eliminate these drawbacks by providing a more adaptable transport system which permits full utilization of the apparatus employed and with a moderate power consumption.

This object is achieved according to the present invention by providing a transport system which comprises a network of transport tracks, vehicles and vehicle drive means, said transport track network including at least two closed track loops each having a track section for the outward trip and a track section for the return trip, said track sections being located between a first and a second region of the track loops, each of said regions including a passenger entry station and a passenger exit station, a pair of vehicle recycling track sections respectively connecting the passenger exit station to the passenger entry station of said first and second regions, at least one distribution and storage track in the form of a closed track loop connected, on the one hand, to the recycling track section of said first region of each of the transport track loops in the vicinity of the passenger entry station by a vehicle supply track and, on the other hand, in the vicinity of the passenger exit station by a vehicle withdrawal track, means for subjecting said vehicle drive means to a single speed program for said vehicles on said track sections for the outward and return trips, and means associated with each passenger entry station for detecting the number of vehicles required on the basis of the number of arriving passengers.

A preferred embodiment of the invention and some modifications thereof will now be described by way of example and with reference to the accompanying drawings, in which.

Figure 1:
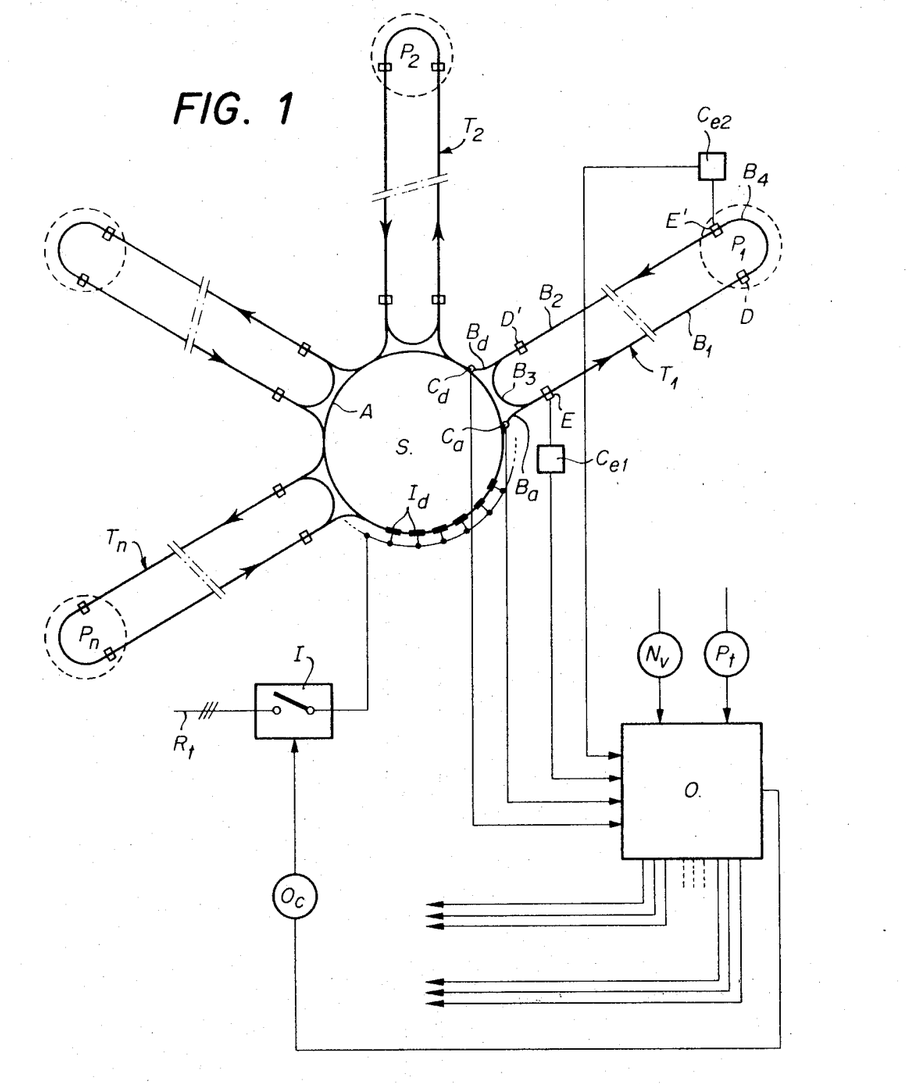
FIG. 1 is a schematic plan view of a transport system according to the invention.

The circuit of the transport system shown in FIG. 1 comprises a generally star-shaped network of tracks with a main station S in the centre and a plurality of satellite stations $P_1, P_2, \ldots P_n$ connected to the main station S by closed track loops $T_1, T_2 \ldots T_n$ each comprising two track sections $B_1$ and $B_2$, one for the outward trip and the other for the return trip, i.e. the track section $B_1$ connecting the main station S to the respective satellite stations $P_1, P_2, \ldots P_n$ and the track section $B_2$ connecting the latter to the main station S. The inlet and outlet ends of the two tracks sections $B_1$ and $B_2$ of each track loop $T_1, T_2, \ldots T_n$ are connected to each other at the main station S by a recycling section $B_3$ and at the respective satellite station $P_1, P_2, \ldots P_n$ by a recycling section $B_4$. Thus the main station S has as many passenger entry and exit points as there are track loops T.

A distribution and storage track A in the form of a closed loop is arranged in the main station S and passes in the vicinity of the recycling track sections $B_3$ of the track loops $T_1, T_2, \ldots T_n$.

Figure 2:
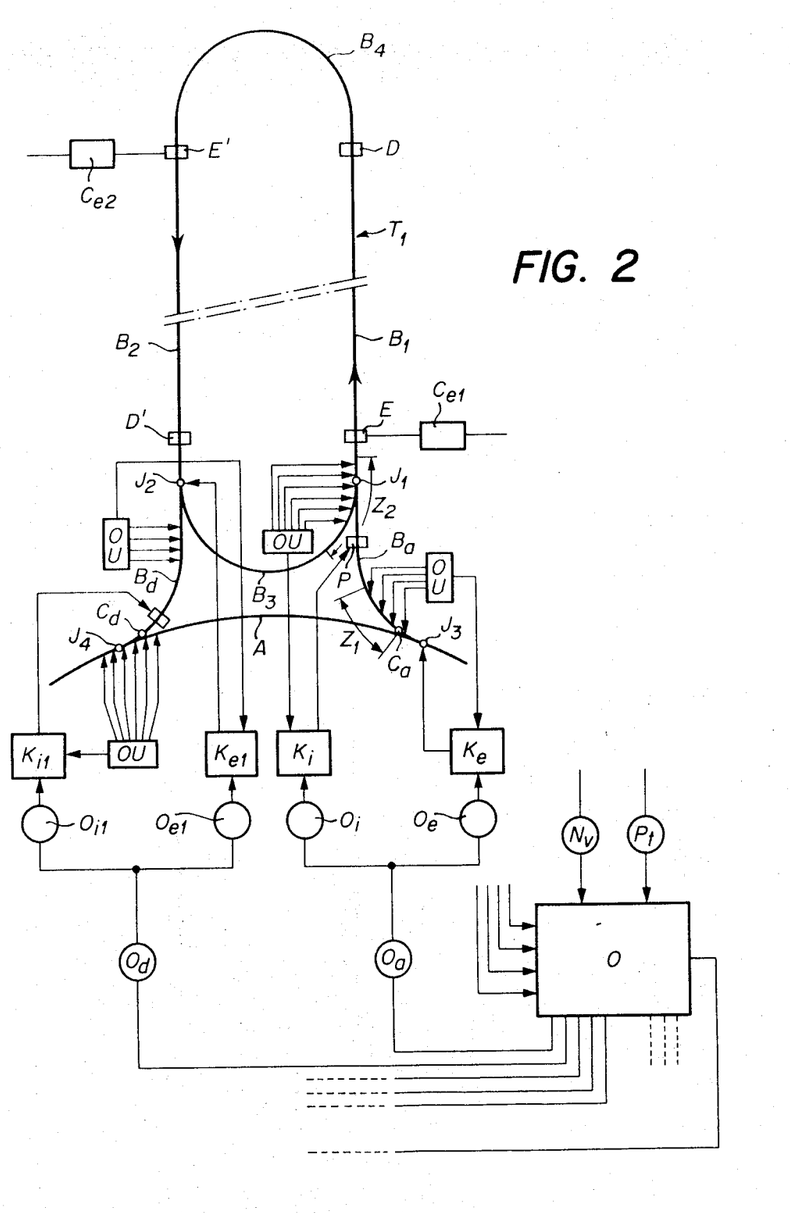
FIG. 2 is an enlarged view of part of the transport system of FIG. 1.

Referring now more particularly to FIG. 2 there is shown therein on a larger scale a track loop $T_1$ and a portion of the distribution and storage track A. The track loop $T_1$ shown in FIG. 2 is provided with two passenger entry stations E, E' and two passenger exit stations D, D' which are located respectively at the junctions between the track sections $B_1$ and $B_3$ and $B_4$, $B_1$ and $B_4$, and $B_2$ and $B_3$.

The exit station D' communicates with the distribution and storage track A through a withdrawal track $B_d$ whereas the entry station E communicates with the distribution and storage track A through a supply track $B_a$. Appropriate, preferably remote-controlled shunting switches are arranged at the junctions $J_1, J_2, J_3$ and $J_4$ of the supply track $B_a$ and the withdrawal track $B_d$ with the recycling track section $B_3$, on the one hand, and with the distribution and storage track A, on the other. Thus the supply track $B_a$ and the withdrawal track $B_d$ form two bifurcations with the distribution and storage track A. With the aid of these bifurcations and the shunting switches arranged at the junctions $J_1, J_2, J_3$ and $J_4$ vehicles travelling on the track loop of the distribution and storage track A can be transferred to the various track loops $T_1, T_2, \ldots T_n$, as desired, over the supply track $B_a$. Similarly and conversely, vehicles travelling on the track loops $T_1$ to $T_n$ may be transferred to the distribution and storage track A over the withdrawal track $B_d$.

Figure 4:
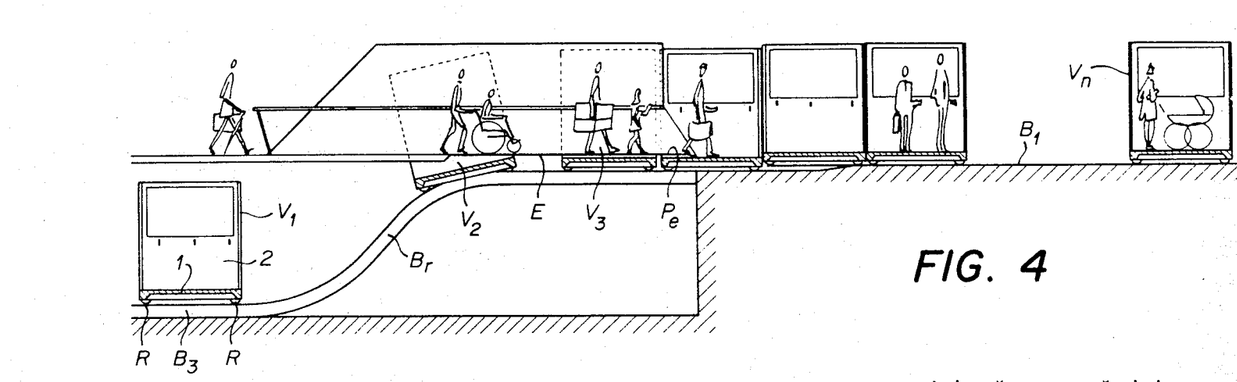
FIG. 4 is a sectional side view of a passenger entry station.

FIG. 4 shows in section the arrangement of the transport system at one of the passenger entry stations E or E'. The arrangement at the passenger exit stations D and D' is exactly the same except that the vehicles move in the opposite direction.

As shown in FIG. 4, the track section $B_1$ and the recycling track $B_3$ are arranged at two different levels. In the illustrated embodiment the passenger entry station E is formed by a platform extending above the recycling track $B_3$ at the same level as the track section $B_1$. The platform terminates with a comb $P_e$ as in the well known moving staircases. The transport track sections $B_1$, $B_2$ and the recycling track section $B_3$ are connected by an inclined connection ramp $B_r$. The vehicles are formed by U-shaped cabins $V_1$, $V_2$, $V_3$, ... $V_n$ each having a bottom 1 and two side walls 2 so that, due to their U-shaped construction, they can disappear at the passenger exit stations and re-appear at the passenger entry stations. Their bottom 1 is provided with four wheels R which run silently on the running tracks formed by rails. Further, the bottom 1 of the cabins is provided with grooves extending parallel to the direction of movement of the cabins, the spacing of the grooves is such as to permit the bottom 1 of each cabin to pass through the teeth of the comb $P_e$. Automatically closing sliding doors (not shown) are provided to close the two ends of the cabin transversely of the running track.

As seen in FIG. 4, the passengers enter the cabins in a line, i.e. they enter and leave the cabins in the direction of movement of the latter. Linear motors (not shown) having their inductors arranged along the running track are used in the illustrated embodiment, for moving the cabins along the various track sections. The spacing of the inductors is chosen to be less than the length of the cabins to avoid excessive variations of the driving and acceleration forces which are felt by the passengers. Further, such an arrangement permits the cabins to be started along the running track independently of the position they may occupy along the track before they are set in motion.

This embodiment also has great advantages from the constructional point of view. In effect, the equipment of the cabins is very simple as the induction coils are arranged on the running track and therefore the cabins need not be supplied with power and only carry a very light armature formed by thin aluminium and steel plates.

As to operation, the speed characteristics may be appropriately laid down for the entire track circuit as the speed of a linear motor is determined by its pole pitch, the input frequency and slip. Consequently, the speed of the cabins can be increased gradually as the cabin is moving away from the passenger entry station until it reaches it maximum speed and can then be reduced again as the cabin is approaching the passenger exit station.

Further, in the regions where the cabins are moving at high speed and the spacing between the cabins is large each inductor may be energized only when a cabin is in its range of action and the most favourable dimensions of the linear inductor may be chosen to the medium thermal dissipation.

Thus, the production cost of the system and the maintenance cost of the cabins are very small. Also the maintenance cost for the entire system is negligible as it is driven without mechanical contact between the stationary and the movable parts and that without current pickup means.

Now that the general arrangement of the transport system according to the present invention has been described, reference will be had again to the block diagrams of FIGS. 1 and 2 to explain the general control means of the transport system, on the one hand, and the insertion of the cabins into the various track loops $T_1$, $T_2$, ... $T_n$ and their withdrawal therefrom, on the other hand.

Referring now more particularly to the block diagram of FIG. 1 there is shown therein a computer O adapted to receive a certain number of data which evidently is not intended to be limited to that hereinafter specifed. On the other hand, for purposes of clarity of the drawing only the control means for the track $T_1$ have been shown in FIG. 1, the control means for the other track loops $T_2$ to $T_n$ being the same.

In the illustrated embodiment the computer initially receives two types of information, namely an information $N_v$ relating to the number of cabins initially present in each portion of the track circuit, i.e. in the various track loops $T_1$, $T_2$, ... $T_n$ and in the distribution and storage track A, and an information $P_t$ relating to the amount of expected traffic which may be established statistically in the form of a program or on the basis of short-term forecasts. This may be the case in a transport system installed, for example, on an airport. In effect, in this case the computer may be fed a certain period of time in advance with information relating to the number of passengers that are expected to get off the planes which are directed to the various satellite stations $P_1$, $P_2$, ... $P_n$.

Two counters $C_a$ and $C_d$ are arranged the first one on the supply track $B_a$ and the second one on the withdrawal track $B_d$ to count the number of cabins which enter or leave, respectively, the track loop $T_1$. Each of the counters $C_a$ and $C_d$ is connected to the computer O as shown in FIG. 1 so that the computer can at any time calculate the difference between the initial number of cabins $N_v$ allocated to the respective track loops $T_1$, $T_2$, ... $T_n$ and the cabins counted at the entry and at the exit, respectively, of the track loops by the counters $C_a$ and $C_d$. Therefore, the computer O will always know the exact number of cabins available on each track loop $T_1$ to $T_n$.

Two further counters $C_{e1}$ and $C_{e2}$ are arranged "upstream" of the passengers entry stations E and E', respectively, to count the number and frequency of the passengers arriving at the entry stations. These counters are connected to two inlets of the computer O as shown in FIG. 1. Therefore, the computer O knows at any time, on the one hand, the number of cabins available on each track loop and, on the other hand, it is capable of predicting traffic fluctuations in each of the track loops $T_1$ to $T_n$ on the basis of the varying numbers of arriving passengers detected by the connectors $C_{e1}$ and $C_{e2}$.

As seen in FIG. 2, the computer O has two outlets $O_a$ and $O_d$ for each track loop $T_1$ to $T_n$. The outlets $O_a$ and $O_d$ transmit to the track loops $T_1$ to $T_n$ cabin supply and cabin withdrawal signals. Each of the outlets $O_a$ and $O_d$ has two branches $O_i$, $O_e$ and $O_{i1}$, $O_{e1}$, respectively. To simplify the description, only the portion of the block diagram relating to the supply track $B_a$ will be described hereinafter, the portion relating to the withdrawal track $B_d$ being the same.

As shown in FIG. 2, each of the branches $O_i$ and $O_e$ is connected to a control member $K_i$ and $K_e$, respectively. Each of the control members $K_i$ and $K_2$ receives an additional information from an associated logic element OU. In the illustrated embodiment the logic elements Ou are formed by proximity detectors symbolized by parallel arrows, and arranged in front of security regions $Z_1$ and $Z_2$, respectively. The security region $Z_1$ is located downstream of the junction $J_3$ as seeen in the direction of movement of the cabins. The security region $Z_2$ is located on either side of the junction $J_1$ along the recycling track section $B_3$.

The detectors of the logic elements Ou serve to inform their associated control members $K_i$ and $K_e$, respectively, whether there are cabins in the respective security regions or whether there are no cabins.

On the basis of the information thus received, the control member $K_e$ causes a cabin V to be transferred from the distributon and storage track A to the supply track $B_a$ or causes no cabin to be thus transferred.

On principle, this operation does not present any particular difficulty. The only necessary and sufficient condition is that the connection track on to which the cabin is to be transferred must have sufficient space free to receive the cabin, which condition is ascertained by the proximity detector OU which has signalled that at this moment there was no cabin on the connection track. If this is not the case, i.e. if a cabin is on the connection track, no cabin is withdrawn from the distribution and storage track A and the cabin appearing at the junction $J_3$ proceeds on its way past the junction $J_3$ which otherwise constitutes the point of withdrawal of the cabins from the distribution and storage track A. So the control member $K_e$ which actuates the shunting switch at the junction $J_3$ only operates when the security region $Z_1$ is free.

However, the operation of inserting the cabins into the track loop $T_1$ is more complex as it is necessary to introduce the cabins into a flow of moving vehicles. Therefore, the security region $Z_2$ does not only extend to the receiving track section located downstream of the junction $J_1$ on the recycling track section $B_3$ but also upstream of the junction $J_1$ on the recycling track section $B_3$. The supply track $B_a$ is provided downstream of the junction $J_3$ with stop and drive means P connected to the outlet of the control member $K_i$ and designed to keep the cabin V as well as other cabins V which may be in the security region $Z_2$ in a stand-by position. The stop and drive means P may be formed, for example, by a change-over switch (not shown) adapted to locally invert the torque of the inductors for a period of time sufficient to stop the cabin. When the security region $Z_2$ is then free the cabin in the stand-by position is moved on to the track section $B_3$ by the stop and drive means P under the control of the control member $K_i$, for example by again inverting the torque of the inductors.

The same operations are ensured at the junctions $J_2$ and $J_4$ to withdraw the cabins from the track loop $T_1$ and transfer the cabins leaving the track loop $T_1$ to the distribution and storage track A.

The size of the security regions $Z_1$ and $Z_2$ will be chosen as a function of the speed of the cabins so that the cabins on the supply track $B_a$ and the withdrawal track $B_d$ are sufficiently spaced from one another to permit a cabin to be stopped when the preceding one has stopped. Since, on the one hand, the speed of the cabins at the supply junctions $J_3$, $J_1$ and the withdrawal junctions $J_2$, $J_4$ is relatively low and since, on the other hand, the cabins are empty at these junctions which are located outside the transport track sections $B_1$ and $B_2$, the length of the security regions $Z_1$ and $Z_2$ may be relatively small.

Referring again to FIG. 1, the computer O has another outlet $O_c$ connected to a contactor I located between a three-phase current supply network $R_t$ and the current supply circuit of the inductors $I_d$ arranged along the distribution and storage track A and forming together with the armatures located on the cabins, the aforementioned linear motors.

The computer O emits a signal through the outlet $O_c$ for closing the contractor I and thereby starting the cabins $V_1$, $V_2$, . . . $V_n$ along the distribution track A each time a supply order is transmitted through the outlet $O_a$ or a withdrawal order through the outlet $O_d$ to one of the track loops $T_1$, $T_2$, . . . $T_n$.

Figure 3:
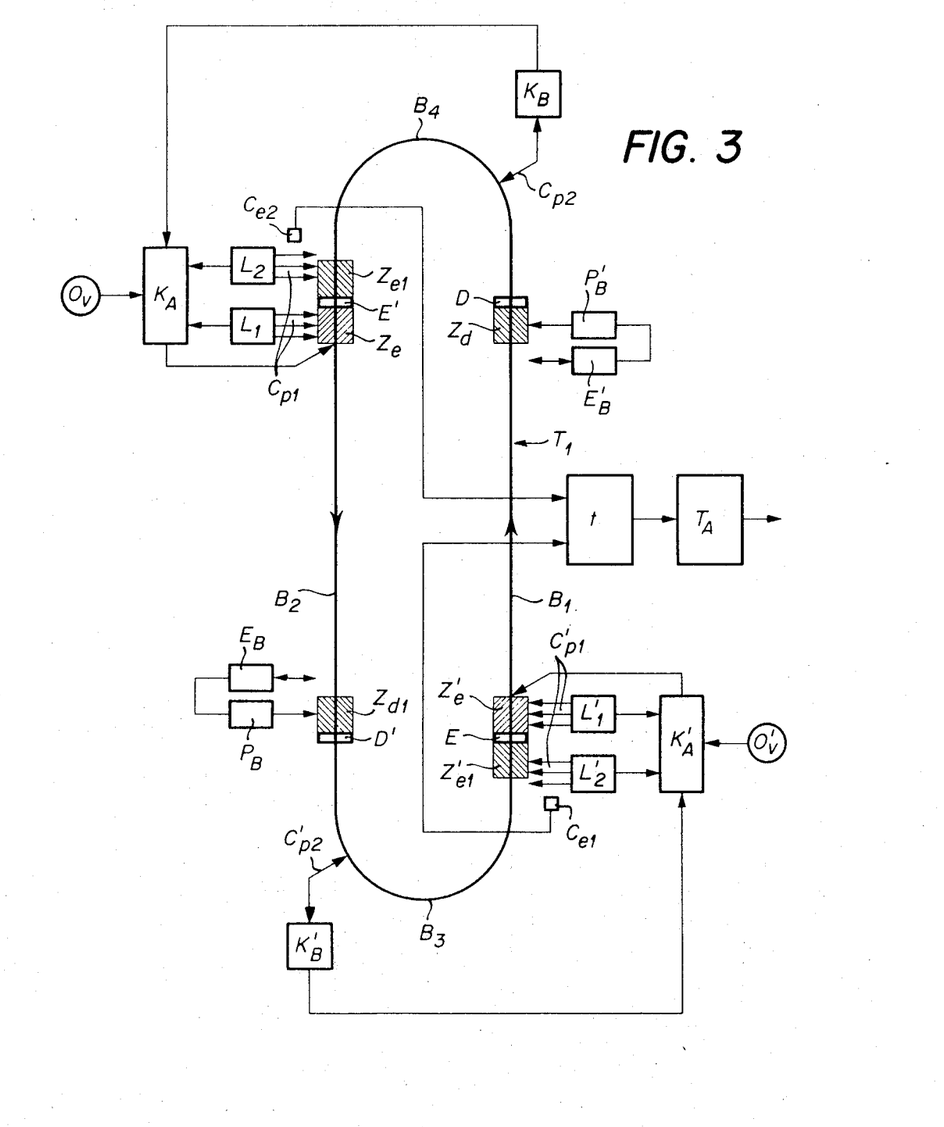
FIG. 3 is a view similar to that of FIG. 2 and showing in a block diagram the control device for one transport loop.

Reference will now be had to the block diagram of FIG. 3 to examine the control means for the track loop $T_1$. To simplify the description only the control means for one half of the track loop $T_1$, i.e. the half comprising the recycling track section $B_4$ and the transport track section $B_2$, will be explained hereinafter, the other half of the track loop being controlled by similar control means.

Arranged in the downstream region $Z_e$ and the upstream region $Z_{e1}$ of the passenger entry station E' is a plurality of pickups $C_{p1}$ for detecting the presence or absence of cabins. The pickups located in the downstream region Z are connected to the inlet of a logic element $L_1$ and the pickups located in the upstream region $Z_{e1}$ are connected to the inlet of a logic element $L_2$. The outlets of the logic elements $L_1$ and $L_2$ are both connected to the inlet of a control member $K_4$ which decides whether a cabin may leave or not under the conditions which will be described hereafter. The inlet of the control member $K_4$ further receives a first starting order $O_v$ which may be given, for example, by a passenger pressing a push-button as in the cabin of a lift or elevator, or by a photoelectric cell located at the entrance of the cabin. A second starting order may be received at the inlet of the control member $K_4$ from another control member $K_B$ having its inlet connected to a pickup $C_{p2}$ for detecting the prolonged presence of cabins in the recycling track section $B_4$, the pickup $Cp_2$ extending along the track section $B_4$ in the vicinity of the passenger exit station D.

Upstream of the passenger exit station D' there is a detector $E_B$ for detecting the arrival of the cabins. The detector $E_B$ is connected to the inlet of a member $P_B$ which controls the starting of the cabins which constantly arrive in the upstream region $Z_{d1}$ of the passenger exit station D'. Finally, each of the aforementioned counters $C_{e1}$ and $C_{e2}$ is connected to the inlet of the resetting delay device $t$ the outlet of which controls a switch $T_4$ for interrupting the power supply system.

The operation of the described track loop $T_1$ is as follows: When a cabin passes from the passenger exit region $Z_d$ upstream of the passenger exit station D to the recycling track section $B_4$, this cabin is moved toward the passenger entry station E' and joins the row of cabins positioned upstream of the passenger entry station E'. As the cabins accumulate along the recycling track section $B_4$ without further cabins leaving the passenger entry station E', and when the entire portion of the recycling track section $B_4$ located between the pickup $Cp_2$ and the passenger entry station E' is full, the pickup $C_{p2}$ detects the prolonged presence of a cabin. To prevent the track section $B_4$ from being choked up with cabins, the control member $K_B$ then transmits to the control member $K_A$ a starting order as soon as the prolonged presence of the cabin detected by the pickup $C_{p2}$ exceeds a predetermined duration. This starting order is repeated each time the pickup $C_{p2}$ detects the presence of a cabin for said predetermined duration.

On the contrary, if the number of passengers is suddenly higher than the number of cabins available on the track section $B_4$ can carry, there may come a moment when the number of cabins is only just sufficient to fill the upstream and downstream passenger entry regions $Z_{e1}$ and $Z_e$. Then the logic element $L_1$ connected to the pickups $Cp_1$ located downstream of the passenger entry station E' informs the control member $K_A$ that it must no longer let the cabins leave. The number of cabins hich must be present in the passenger entry regions $Z_e$ and $Z_{e1}$ will be determined mainly by criteria of security. As soon as an additional cabin is detected upstream of the region $Z_{e1}$ the logic element $L_1$ imparts to the control member $K_A$ the permission for starting the cabin located downstream of the region $Z_e$ and this cabin is moved toward the passenger exit station D' by means of linear motors (not shown) as on the distribution and storage track A. When the cabin arrives at the detector $E_B$ the latter informs the control member $P_B$ which then sets in motion the cabins retained in the passenger exit region $Z_{d1}$. This movement takes place with speed characteristics predetermined as to time and the duration of the starting order is so chosen that the cabin is moved by a distance corresponding to its length. When going to extremes and with rapid movement of the cabins along the transport track section $B_2$, the movement of the cabins in the passenger exit region $Z_{d1}$ will become continuous.

Finally, each time one of the counters $C_{e1}$ or $C_{e2}$ detects the passage of a passenger, the delay device $t$ is reset to zero. After a certain period of time determined by the characteristics of the track loop $T_1$, when no reset signal is transmitted by the counters $C_{e1}$ and $C_{e2}$, the output of the delay device $t$ opens the switch $T_A$ which interrupts the power supply to the entire track loop $T_1$.

There are three modes of operation for each of the track loops $T_1, T_2, \ldots T_n$, which are as follows:

a. The track loop operates at maximum capacity after having received the required number of cabins from the distribution and storage track A. To insure this manner of operation, the cabins move continuously and walk in the same way as a moving sidewalk in the regions upstream and downstream of the passenger exit stations D, D' and passenger entry stations E, E'.

b. The traffic diminishes but the computer O does not supply an order for evacuation of the respective track loop $T_1$ to $T_n$ as no track loop requires additional cabins.

In this case the cabins are stopped and started again when one or more passengers enter the cabin located aheaad of the passenger entry stations E, E'.

c. Traffic is practically down to zero and the computer O has given the order for evacuation of the respective track loop. In this case the respective track loop $T_1$ to $T_n$ must obviously retain a minimum number of cabins downstream and upstream of the passenger entry and exit stations.

Downstream of the passenger entry stations the waiting cabins are kept in engagement with one another. The front doors of the last cabin are closed. When a passenger enters the corridor formed by the cabin he walks up to the bottom of the corridor. Closing of the rear doors of the first cabin, i.e. the cabin located at the downstream end of the corridor, and starting of this cabin is controlled either automatically or manually, as described bbefore. Thus, the occupied cabin is set in motion and its place is taken by the last but one cabin. Simultaneously a new cabin is transferred from the region $Z_{e1}$ of the recycling track section $B_3$ or $B_4$, respectively, to the region $Z_e$ in front of the associated passenger entry station to ensure a continuous passenger entry corridor. Therefore, a certain minimum number of cabins must always be positioned on the respective track loops $T_1$ to $T_n$.

Also a certain number of cabins must always be retained in the region upstream of the passenger exit stations D and D' to ensure a continuous movement on passing the comb. When the occupied cabin is approaching, the cabins waiting before the passenger exit stations D or D' begin to move as described previously. The front doors of the occupied cabins do not open until this cabin has joined the waiting cabins. This operation is carried out without stopping the cabin with passengers.

Figure 5:
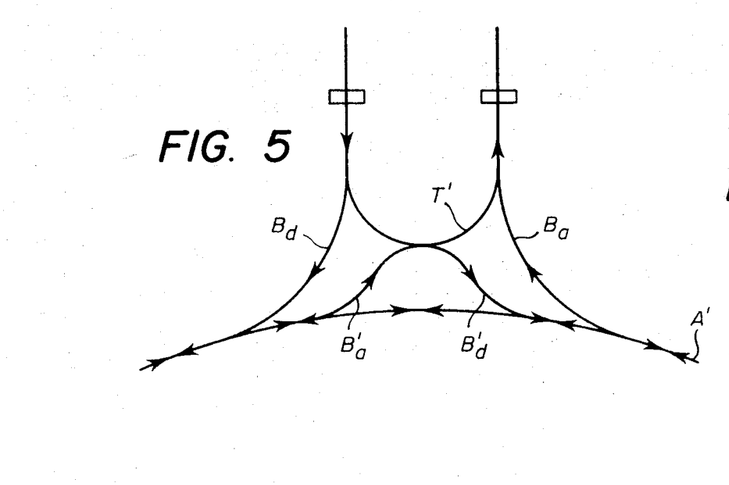
FIG. 5 schematically shows a modification of the passenger entry station of FIG. 4, and FIG. 6 schematically shows a modification of the transport system of FIG. 1.

In the modified embodiment of the transport system shown in FIG. 5, the track loop T' shown therein is provided with a second supply track $B'_a$ and a second withdrawal track $B'_d$ in addition to the supply track $B_a$ and the withdrawal track $B_d$. This arrangement permits cabins to be supplied to and withdrawn from the track loop T' irrespective of the direction of movement of the cabins on the distribution track A' as is shown by the arrows on the various track sections $B_a$, $B_d$ and $B'_{a'}$, $B'_{d'}$.

Figure 6:
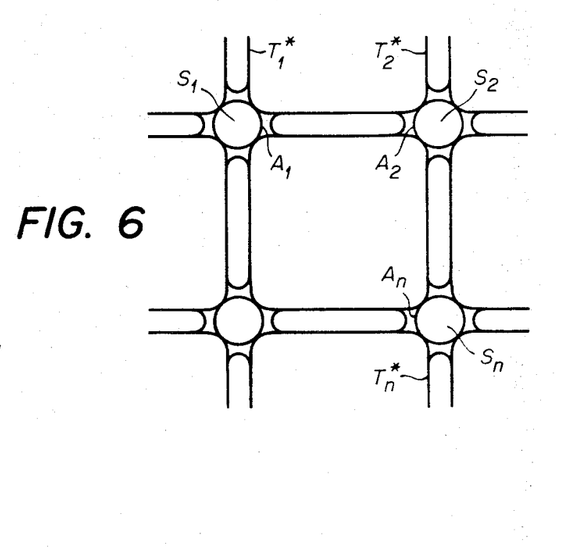

Finally, FIG. 6 shows a modification of the transport system formed by a network of trick loops $T^*_1, T^*_2, \ldots T^*_n$ which with their ends are connected to distribution and storaged tracks $A_1, A_2, \ldots A_n$.

As will be evident from the foregoing description, the transport system proposed by the present invention is extremely adaptable as, on the one hand, the cabins are made to circulate according to requirements and, on the other hand, the cabins can be transferred from one transport track loop to another as required. It will further be noted that one of great advantages of this transport system is that the transport cabins are waiting for the passengers and not the passengers for the transport cabins.

Although a preferred embodiment of the invention has been described herein and illustrated in the accompanying drawing it is to be understood that the invention is not limited to this precise embodiment and that numerous changes and modifications may be made therein without departing from the scope of the invention.

We claim:

1. A transport system comprising a network of transport tracks, vehicles and vehicle drive means, said transport track network including at least two closed track loops each having a track section for the outward trip and a track section for the return trip, said track sections being located between a first and a second region of the track loops, each of said regions including a passenger entry station and a passenger exit station, a pair of vehicle recycling track sections respectively connecting the passenger exit station to the passenger entry station of said first and second regions, a vehicle supply track, a vehicle withdrawal track, at least one distribution and storage track in the form of a closed track loop connected, to the recycling track section of said first region of each of the transport track loops in the vicinity of the passenger entry station by said vehicle supply track and in the vicinity of the passenger exit station by said vehicle withdrawal track, means for subjecting said vehicle drive means to a single speed program for said vehicles on said track sections for the outward and return trips, means associated with each passenger entry station for detecting the number of vehicles required on the basis of the number of arriving passengers comprising a pair of vehicle counters arranged one at each exit end of the transport track sections for counting the vehicles entering and leaving the track loops, a pair of passenger counters arranged one at each of the passenger entry stations of the transport track sections for counting the passengers entering the entry stations, shunting switches arranged at the inlet of said vehicle supply and withdrawal track sections, and a computer receiving inputs from said pair of vehicle counters and said pair of passenger counters and providing outputs controlling said shunting switches and movements of said vehicles.

* * * * *

Dedication 3,788,232.—*Karl Schneider*, Plan-les-Ouates/Geneve; *Gerard Cuenoud*, Grand-Lancy/Geneve; *Gabriel Bouladon*, Versoix/Geneve and *Paul Zuppiger*, Athenaz/Geneve, Switzerland. TRANSPORT SYSTEM. Patent dated Jan. 29, 1974. Dedication filed Mar. 26, 1984, by the assignee, *Battelle Memorial Institute*.

Hereby dedicates to the People of the United States the entire remaining term of said patent.

[*Official Gazette May 29, 1984.*]